(12) United States Patent
Wirt et al.

(10) Patent No.: US 8,017,084 B1
(45) Date of Patent: Sep. 13, 2011

(54) AMMONIA INJECTION GRID FOR A SELECTIVE CATALYTIC REDUCTION SYSTEM

(75) Inventors: Jeffrey Philip Wirt, Tulsa, OK (US); Richard Martin, Tulsa, OK (US)

(73) Assignee: Callidus Technologies, L.L.C., Tulsa, OK (US)

( * ) Notice: Subject to any disclaimer, the term of this patent is extended or adjusted under 35 U.S.C. 154(b) by 571 days.

(21) Appl. No.: 12/137,324

(22) Filed: Jun. 11, 2008

(51) Int. Cl.
  *B01D 53/90* (2006.01)
(52) U.S. Cl. ......... 422/172; 422/176; 261/118; 366/337
(58) Field of Classification Search .................. 422/172, 422/176, 228; 261/118; 366/336, 174.1; 137/896; 239/432
  See application file for complete search history.

(56) References Cited

U.S. PATENT DOCUMENTS

| | | | |
|---|---|---|---|
| 3,297,305 A * | 1/1967 | Walden | 366/101 |
| 4,744,313 A | 5/1988 | Hoskinson | |
| 4,950,473 A * | 8/1990 | Flockenhaus et al. | 423/235 |
| 5,380,088 A * | 1/1995 | Fleischli et al. | 366/162.1 |
| 5,435,976 A * | 7/1995 | Berner et al. | 422/168 |
| 5,456,533 A | 10/1995 | Streiff et al. | |
| 5,988,115 A * | 11/1999 | Anderson et al. | 122/4 D |
| 5,997,822 A * | 12/1999 | Komai et al. | 422/168 |
| 6,394,644 B1 * | 5/2002 | Streiff | 366/337 |
| 6,435,138 B2 * | 8/2002 | Shimada et al. | 122/7 R |
| 6,887,435 B1 | 5/2005 | Albrecht et al. | |
| 6,905,658 B2 * | 6/2005 | Rogers et al. | 422/172 |
| 7,638,107 B1 * | 12/2009 | Wirt et al. | 423/239.1 |
| 7,793,494 B2 * | 9/2010 | Wirth et al. | 60/324 |
| 2002/0081241 A1 * | 6/2002 | Sigling | 422/172 |
| 2006/0157132 A1 | 7/2006 | Buzanowski et al. | |

* cited by examiner

*Primary Examiner* — Jill Warden
*Assistant Examiner* — Joye L Woodard
(74) *Attorney, Agent, or Firm* — Head, Johnson & Kachigian, P.C.

(57) ABSTRACT

An ammonia injection grid for a selective catalytic reduction (SCR) system that provides uniform distribution of ammonia to the SCR catalyst in $NO_x$ reduction systems for heat recovery steam generation systems, packaged boilers, simple cycle catalyst systems and fired heaters for superior operational efficiency. The ammonia injection grid includes an injection tube having at least one nozzle for injecting ammonia into a flow of flue gas. The ammonia injection grid also includes a corrugated turbulence enhancer associated with the injection tube to generate turbulent wake to enhance turbulent mixing.

29 Claims, 10 Drawing Sheets

AMMONIA INJECTION GRID FOR A SELECTIVE CATALYTIC REDUCTION SYSTEM

FIELD OF THE INVENTION

This invention relates generally to an ammonia injection grid for a selective catalytic reduction (SCR) system, and more particularly to an ammonia injection grid for a SCR system that provides uniform distribution of ammonia to the SCR catalyst in NO reduction systems for heat recovery steam generation systems, packaged boilers, simple cycle catalyst systems and fired heaters for superior operational efficiency.

DESCRIPTION OF THE RELATED ART

NO refers to the cumulative emissions of nitric oxide (NO), nitrogen dioxide ($NO_2$) and trace quantities of other chemicals during combustion which are environmentally hazardous substances. Combustion of fossil fuels generates some level of NO, due to high temperatures and availability of oxygen and nitrogen from both the fuel and air. NO emissions may be controlled using low NO combustion technology and post-combustion techniques, such as selective catalytic reduction (SCR). SCR systems catalytically reduce flue gas NO to nitrogen and water using ammonia ($NH_3$) in a chemical reaction.

SCR systems treat the NO before the gas is released into the atmosphere. SCR systems rely on a catalyst to treat flue gas as the gas passes through the SCR system. Because the catalyst is an integral part of the SCR chemical reaction, SCR systems attempt to provide maximum exposure of the catalyst to the flue gas in order to ensure that all the flue gas comes sufficiently into contact with the catalyst for treatment.

The catalysts used in SCR systems are carefully engineered and expensive. Thus it is beneficial to be able to control the stoichiometry of the exhaust gas/ammonia/catalyst reaction. In SCR systems, the ammonia is typically introduced into the flue gas stream using an injection grid comprised of injection tubes having a plurality of injection ports or nozzles. The injection grid is designed to provide an even distribution of ammonia throughout the flue gas. The particular injection grid configuration and size utilized within the SCR system is based upon the size of the flue conveying the flue gas stream, as well as the distance from the injection grid to the inlet of the catalyst bed of the SCR. A long distance between the injection grid and the SCR catalyst must typically be provided to assure acceptable turbulent mixing of the ammonia and flue gas. Longer distances require fewer ammonia injectors since adequate mixing can occur prior to the mixture of the flue gas and ammonia entering the SCR catalyst bed. Shortening the distance between the injection point and the catalyst is often desirable, and in new constructions a long distance is often unavailable due to a limited footprint for the ductwork. In a retrofit application, a long distance may require cost prohibitive modifications to the existing system.

Commonly ammonia, as a reducing agent, is injected and distributed through the injection grid into the flow of flue gas. The nozzles on the injection grid are typically arranged so as to inject the ammonia into and parallel with the flue gas towards the catalyst located downstream. For example, the SCR of $NO_x$ involving the injection of ammonia into the flow of flue gas in the presence of the catalyst occurs as the following chemical reactions:

$$4NH_3+4NO+O_2 \rightarrow 4N_2+6H_2O;$$

$$4NH_3+2NO_2+O_2 \rightarrow 3N_2+6H_2O;$$

$$4NH_3+6NO \rightarrow 5N_2+6H_2O;$$

$$4NH_3+3O_2 \rightarrow 2N_2+6H_2O;$$

$$4NH_3+5O_2 \rightarrow 4NO+6H_2O; \text{ and}$$

$$8NH_3+6NO_2 \rightarrow 7N_2+12H_2O.$$

Ammonia in commonly injected through the injection grid into the flow of flue gas by utilizing an external ammonia vaporization system wherein liquid ammonia, either in an anhydrous or aqueous state, is vaporized in a heater or vaporizer, mixed with dilution air, and then routed to the injection grid for injection into the flow of flue gas at a location upstream of the SCR system. Typically, the ammonia is diluted with water prior to being injected through the injection grid into the flow of flue gas.

Ammonia injection grids with zone controls have been installed to distribute a prescribed amount of ammonia for $NO_x$ reducing SCR systems. To increase the mixing efficiency and reduce the required mixing distance, many SCR installations are equipped with static mixers. Static mixers typically utilize elaborate designs, high fabrication, and installation cost, along with resulting in a significant pressure drop. Static mixers are typically installed between the ammonia injection grid and the SCR catalyst; however, deflectors or baffles attached to the injection nozzles or turbulence enhancers installed between the injection tubes have also been utilized.

Known deflectors or baffles attached to the injection nozzles installed between the injection tubes of ammonia injection grids commonly utilize horizontal baffles for creating a turbulent mixing effect. Other deflectors utilize airfoils for mixing gas streams in secondary air supply ducts and SCR system flues. Other ammonia injection grids utilize square injection tubes rather than conventional circular tubes. These square injection tubes form a sharp edge to increase the mixing efficiency of the ammonia and flue gas. Other known deflectors utilize a single plate located in an upstream position from the injection tubes to create a wake downstream to increase the ammonia flue gas mixing efficiency.

While these known local baffles and deflectors installed between the injection tubes of ammonia injection grids increase the mixing efficiency, none provide for even distribution of ammonia to a downstream SCR catalyst for heat recovery, steam generation systems, packaged boilers, simple cycle catalyst systems, and fired heaters.

It is therefore desirable to provide an ammonia injection grid for a SCR system that provides unified distribution of ammonia to the SCR catalyst in $NO_x$ reduction systems.

It is further desirable to provide an ammonia injection grid utilizing a novel turbulence enhancer associated with a downstream side of the injection tubes.

It is still further desirable to provide an ammonia injection grid utilizing turbulence enhancers installed on the downstream side of the injection tubes that may be retrofitted to existing ammonia injection grids.

It is yet further desirable to provide an ammonia injection grid utilizing a corrugated turbulence enhancer attached to a downstream side of the injection tubes of the ammonia injection grid to provide unified distribution of ammonia to the SCR catalyst.

SUMMARY OF THE INVENTION

In general, the invention relates to an ammonia injection grid including an injection tube having at least one nozzle for injecting ammonia into a flow of flue gas and a corrugated turbulence enhancer associated with the injection tube to generate turbulent wake to enhance turbulent mixing. The injection tube extends generally transverse to the flow of flue gas. The injection tube may be a plurality of elongate, circular injection tubes aligned in parallel, with each injection tube having a plurality of nozzles. Further, the corrugated turbulence enhancer may be a plurality of corrugated turbulence enhancers associated with each injection tube.

Each nozzle of the ammonia injection grid may form an approximate 75 degree angle relative to the upstream flow of flue gas. Further, the ammonia injection grid comprises a plurality of ammonia injection grid panels, such as at least one upper ammonia injection grid panel and at least one lower injection grid panel. The ammonia injection grid can also include an upper header and a lower header in fluid communication with the injection tube for supplying ammonia to the injection tube. The upper header and the lower header may be provided with a substantially V-shaped baffle plate to further increase the mixing efficiency of the ammonia injection grid. The substantially V-shaped baffle plate of the upper header and the lower header may form an approximate 44 degree angle relative to the flow of flue gas. The ammonia injection grid may include a nozzle in the upper header and a nozzle in the lower header, wherein the nozzle of the upper header and the nozzle of the lower header inject ammonia substantially perpendicular to the flow of flue gas.

The corrugated turbulence enhancer of the ammonia injection grid may be associated with a downstream side of the injection tube. The corrugated turbulence enhancer may include a first trailing end and a second trailing end connected to a substantially V-shaped middle section. An apex of the substantially V-shaped middle section may form a trailing middle section, while the injection tube may be associated with a furrow of the substantially V-shaped middle section of the corrugated turbulence enhancer. Additionally, the first trailing end and the second trailing end of the corrugated turbulence enhancer may form an approximate 32 degree angle relative to the flow of flue gas. The corrugated turbulence enhancer may be substantially M-shaped in cross section. The corrugated turbulence enhancer may include a first leading end joined to the first trailing end and a second leading end joined to the second trailing end 64. The corrugated turbulence enhancer may be in the form of three (3) contiguous, substantially V-shaped sections.

Other advantages and features will be apparent from the following description, and from the claims.

DETAILED DESCRIPTION OF THE PREFERRED EMBODIMENTS

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
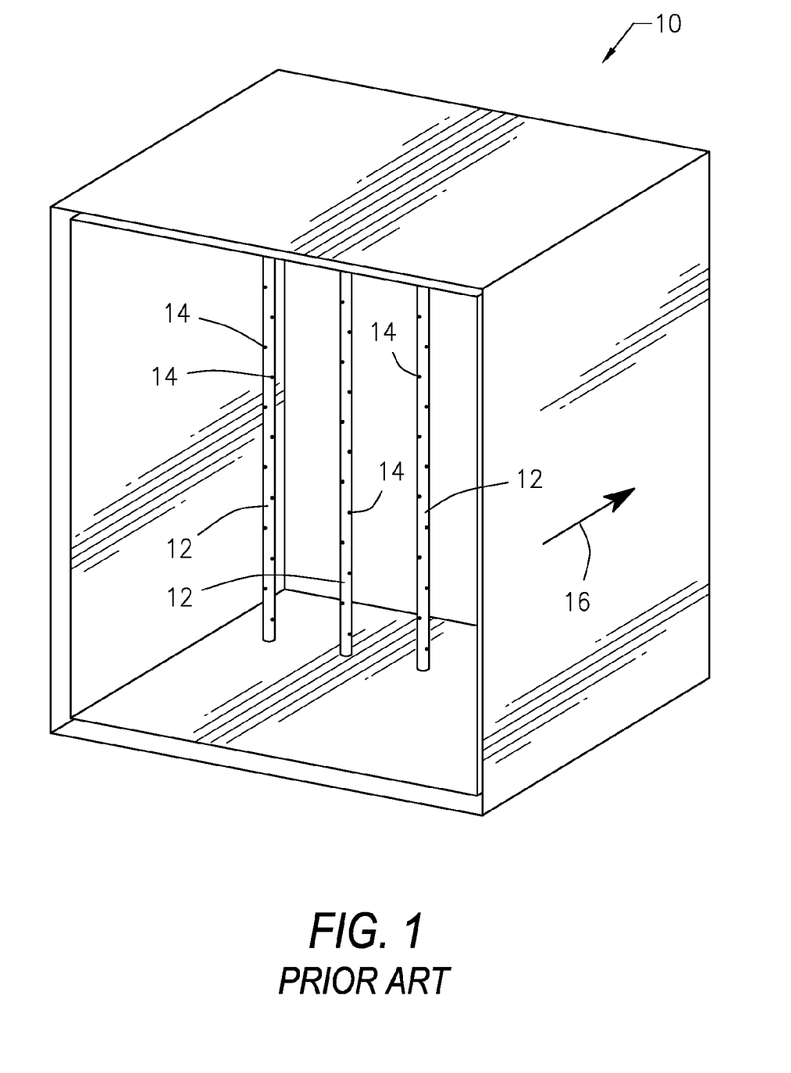
FIG. 1 is a perspective view of a prior art ammonia injection grid utilizing circular injection tubes having a plurality of injection nozzles angled forty-five (45) degrees upstream relative to the flow of flue gas.

Referring to the figures of the drawings, FIG. 1 is a perspective view of a prior art ammonia injection grid (AIG) 10 utilizing a plurality of circular injection tubes 12 having a plurality of injection nozzles 14 angled forty-five (45) degrees upstream relative to the flow of flue gas 16. The AIG 10 is upstream of the SCR catalyst (not shown). The injection nozzles 14 along the length of the circular injection tubes 12 direct diluted ammonia into the flow of flue gas 16. The injected diluted ammonia is mixed with the flue gas by turbulent wake created by the injection tubes.

Figure 2:
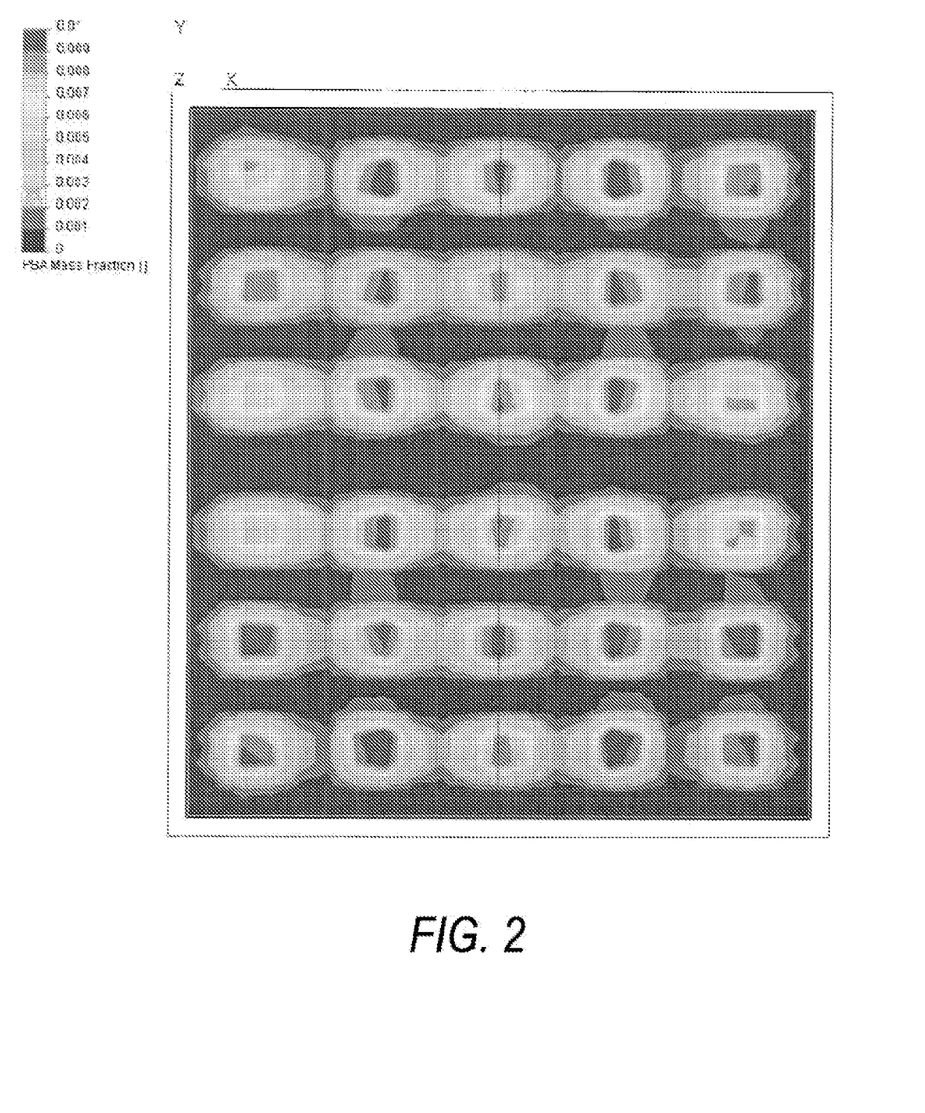
FIG. 2 illustrates flow distribution of the prior art ammonia injection grid of FIG. 1 at approximately three (3) feet downstream from the injection grid.

FIG. 2 illustrates the flow distribution of the ammonia injection grid 10 of FIG. 1 utilizing a computational fluid dynamics (CFD) analysis at approximately three (3) feet downstream from the ammonia injection. As can be seen in FIG. 2, the injected diluted ammonia is not uniformly distributed at the face of the catalyst, and thus adequate mixing of the flue gas and ammonia is not accomplished prior to entering the downstream SCR catalyst bed.

Figure 3:
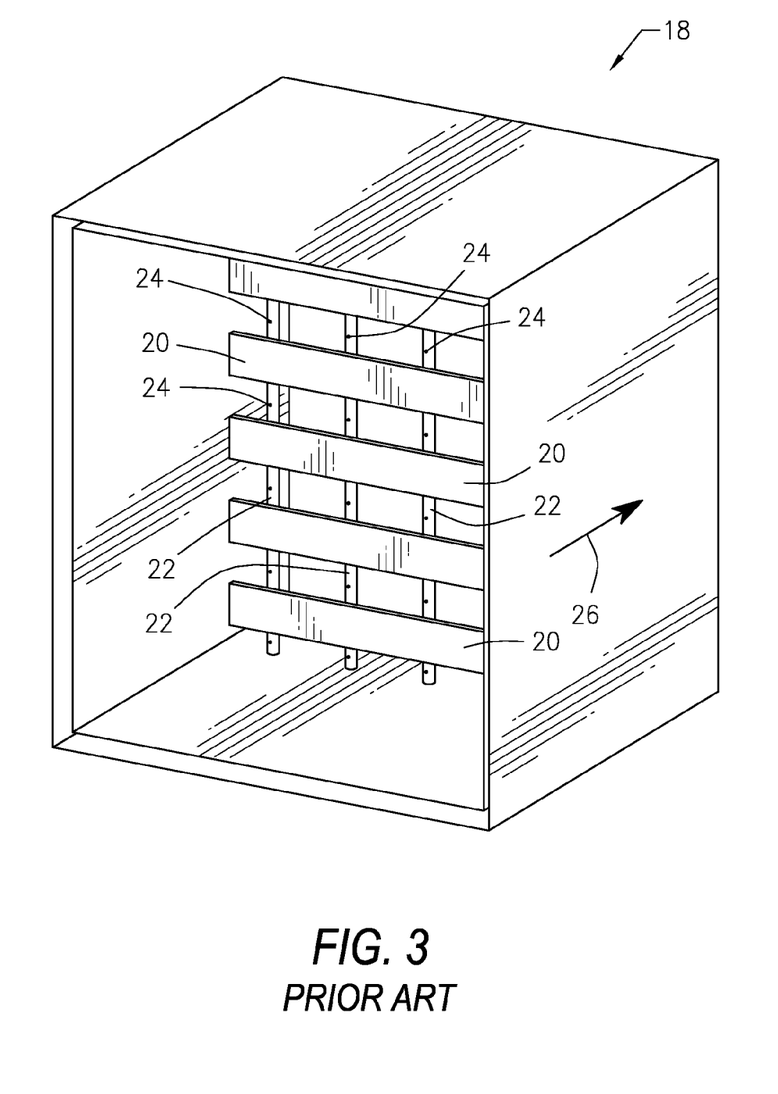
FIG. 3 is a perspective view of a prior art ammonia injection grid utilizing a plurality of horizontal baffle plates attached to the upstream side of the injection tubes for creating turbulent mixing of the ammonia and the flue gas.

FIG. 3 is a perspective view of another prior art ammonia injection grid 18 utilizing a plurality of horizontal baffle plates 20 attached to the upstream side of the injection tubes 22 for creating turbulent mixing of the ammonia and the flue gas. The AIG of FIG. 3 is comprised of a plurality of injection tubes 22 each having a plurality of nozzles 24. The nozzles 24 are arranged so as to inject the diluted ammonia into the flow of the flue gas 26 prior to entering the catalyst (not shown) located downstream. The ammonia supplied to the injection tubes 22 may be via headers (not shown). The plurality of horizontal baffle plates 20 are attached to the upstream side of the injection tubes 22 for creating a wake to increase the turbulent mixing between the ammonia and the flue gas.

Figure 4:
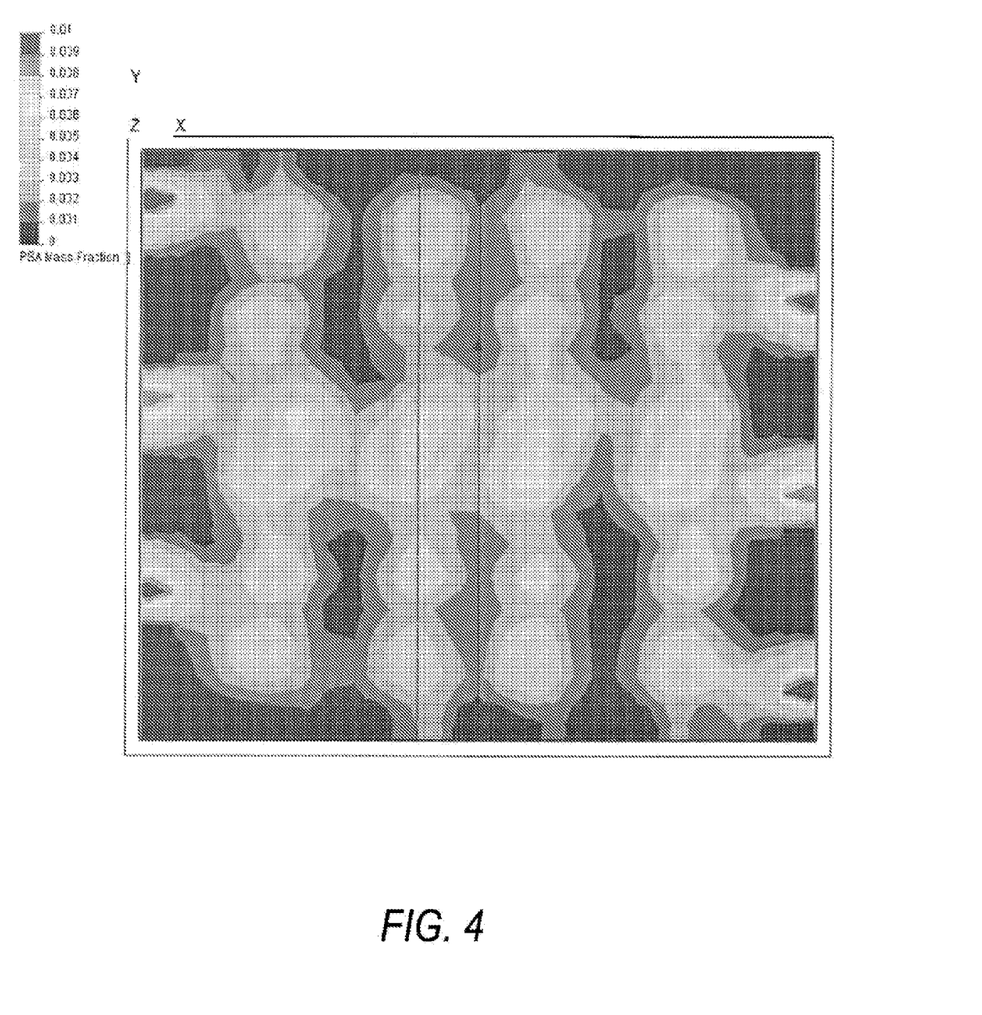
FIG. 4 illustrates flow distribution of the prior art ammonia injection grid of FIG. 3 at approximately three (3) feet downstream from injection.

FIG. 4 illustrates the flow distribution using CFD modeling of the prior art AIG of FIG. 3 at approximately three (3) downstream from the ammonia injection. As can be seen, the plurality of horizontal baffle plates 20 increases the distribution of ammonia within the flue gas by creating a lower pressure area downstream from the ammonia injection, and thereby creates a turbulent mixing effect. Even though the AIG 18 incorporating horizontal baffle plates 20 increases the mixing efficiency over an AIG without baffle plates, as shown in FIGS. 1 and 2, it does not result in uniform distribution of ammonia and flue gas prior to entering the downstream SCR catalyst bed. As can be further seen in FIG. 4, the horizontal baffle plates 20 cause the injected ammonia to stratify between the injection tubes 22 with an approximate eight to ten percent RMS value at three feet downstream of the injection tubes 22 at the face of the SCR catalyst bed.

Figure 5:
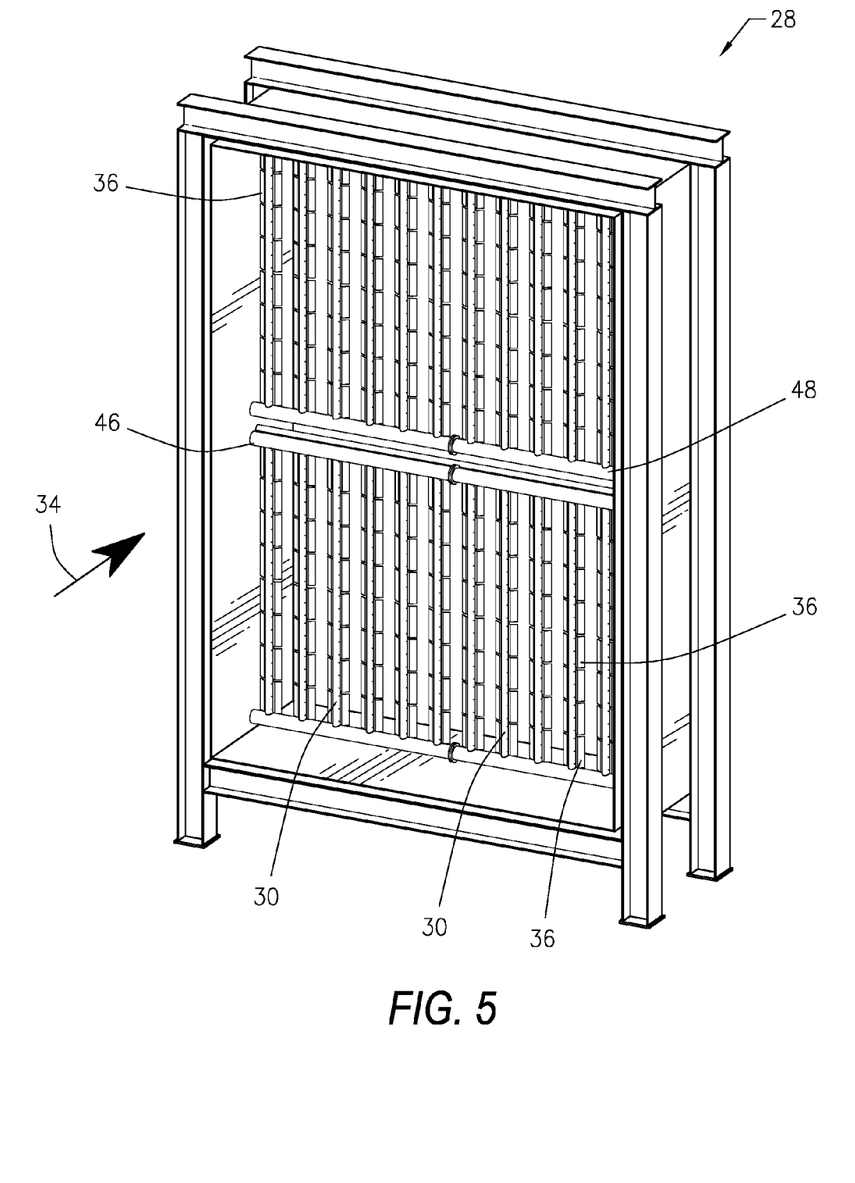
FIG. 5 is a perspective view of an example of an ammonia injection grid in accordance with an illustrative embodiment of the ammonia injection grid for selective catalytic reduction systems disclosed herein.
Figure 6:
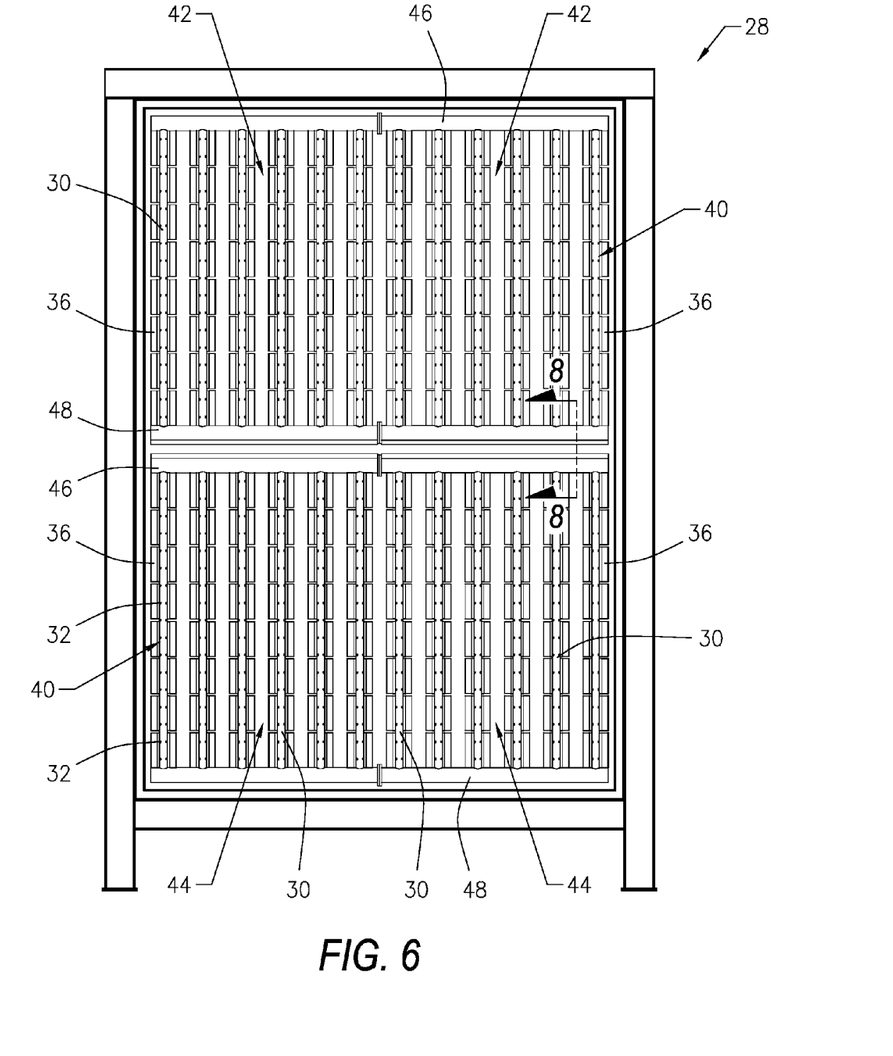
FIG. 6 is an elevation view looking upstream of an example of an ammonia injection grid in accordance with an illustrative embodiment of the ammonia injection grid for selective catalytic reduction systems disclosed herein.
Figure 7:
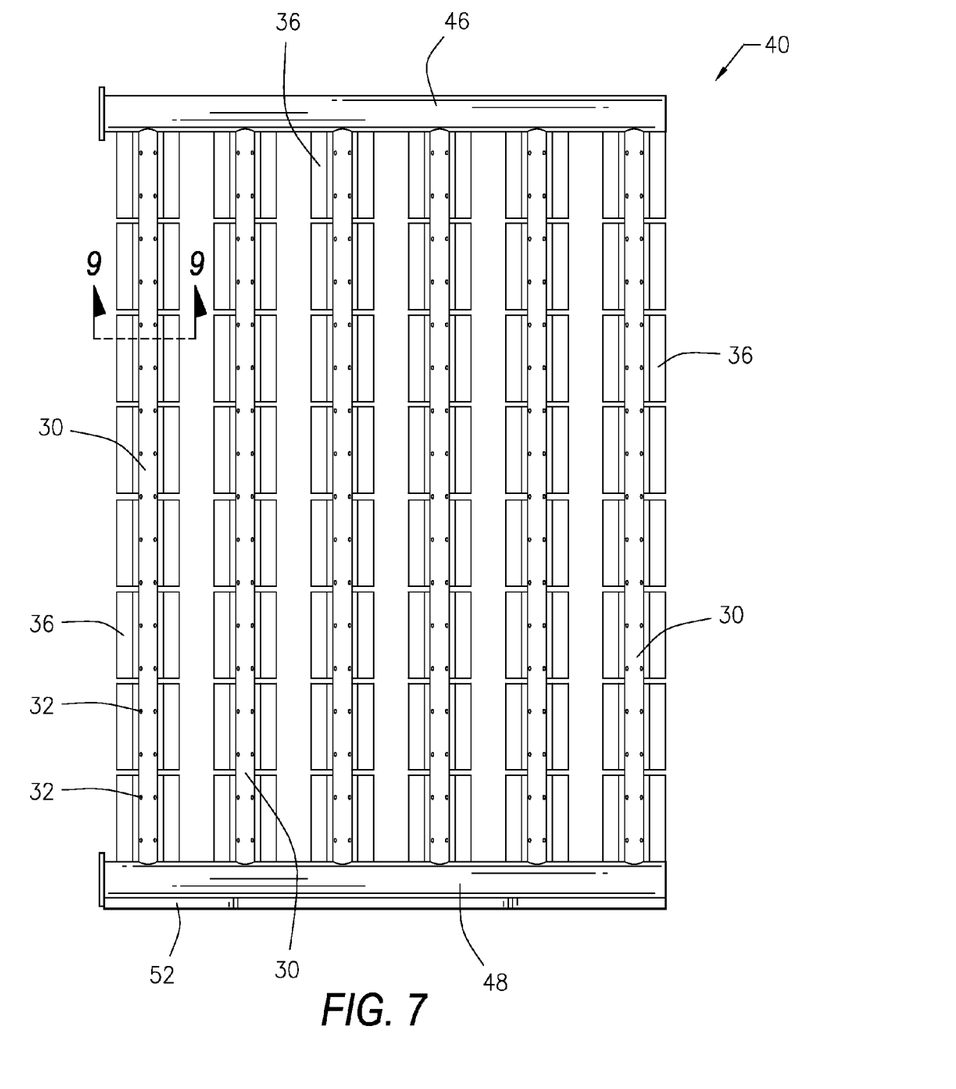
FIG. 7 is an elevation view looking upstream of an ammonia injection grid panel in accordance with an illustrative embodiment of the ammonia injection grid for selective catalytic reduction systems disclosed herein.

Referring now to FIGS. 5 through 10, wherein like numerals of reference designate like elements throughout the several views, and initially to FIGS. 5 and 6, an ammonia injection grid 28 having at least one injection tube 30 with at least one nozzle 32 for injecting ammonia into the flow of flue gas 34. Each injection tube 30 extends generally transverse to the flow of flue gas depicted by arrow 34 and includes at least one corrugated turbulence enhancer 36 associated therewith to generate a turbulent wake downstream of the injection to enhance mixing of the injected ammonia and flue gas. The AIG 28 may include a plurality of injection tubes 30, with each injection tube 30 having a plurality of nozzles 32. The nozzles 32 may form an upstream angle 38 relative to the flow of flue gas 34, such as an approximate seventy-five (75) degree angle opposite to the flow of flue gas 34. Each of the injection tubes 30 may have a plurality of corrugated turbulence enhancers 36 associated therewith. The injection tubes 30 may be vertical and in parallel alignment. However, those skilled in the art will appreciate that other alignments and arrangements may be used with the AIG 28, such as vertical or diagonal. As shown, the injection tubes 30 are aligned along the same plane, but may also be in a staggered arrangement.

As shown in FIG. 6, the AIG 28 may include a plurality of ammonia injection panels 40, such as at least one upper ammonia injection panel 42 and at least one lower ammonia injection panel 44 adjacent each other. Each ammonia injection panel 40 may include an upper header 46 and a lower header 48, with a plurality of elongate, circular injection tubes 30 disposed there between.

Figure 8:
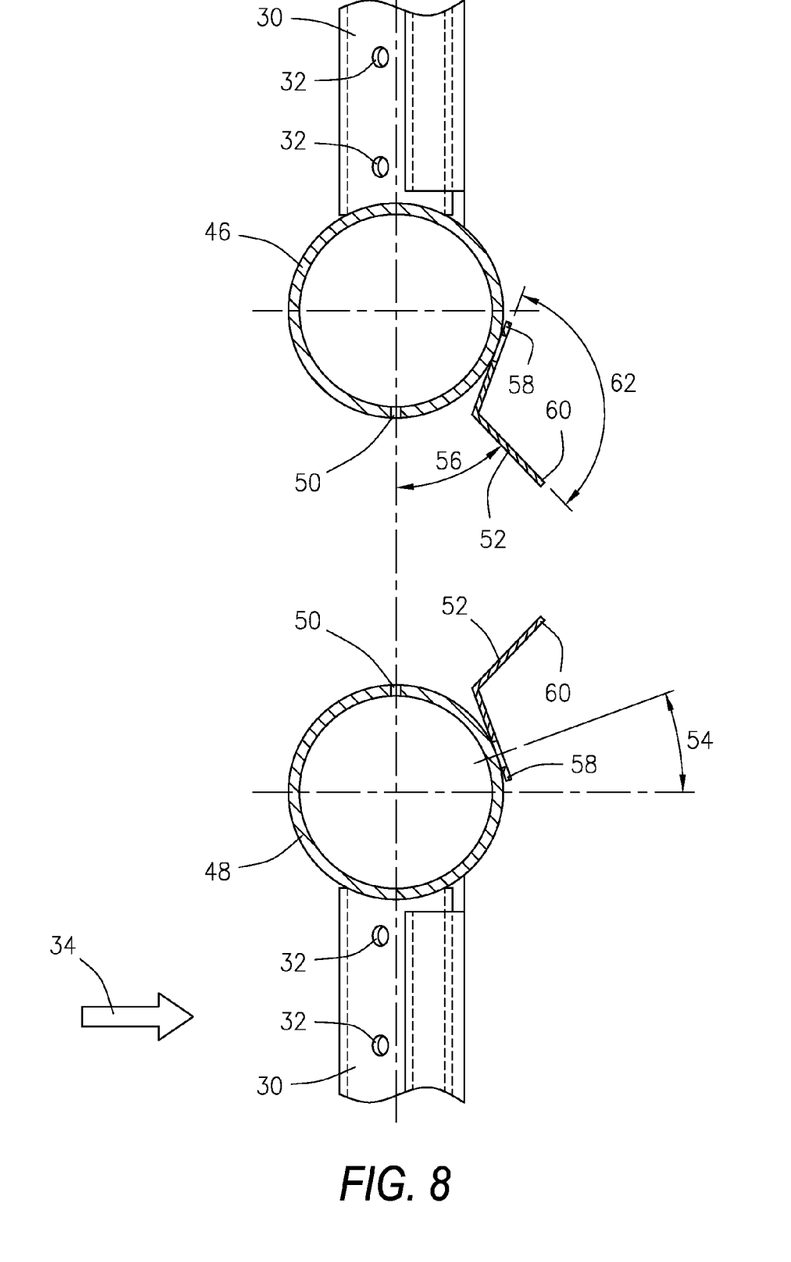
FIG. 8 is a cross section view along line 8-8 of the ammonia injection grid shown in FIG. 6.

The AIG 28 may include headers, such as at least one upper header 46 and at least one lower header 48, in fluid communication with the injection tubes 30 for supply ammonia from an ammonia vaporizer or heater (not shown) to each of the injection tubes 30. The ammonia vaporizer or heater (not shown) may be of the type discussed in Applicants' co-pending application, titled Air Ammonia Heater and Vaporization Chamber System, Ser. No. 12/137,275, which is incorporated herein by reference. Further, the AIG 28 may be integrated into an SCR system, such as of the type discussed in Applicants' co-pending application, titled Multi-Bed Selective Catalytic Reduction System, Ser. No. 12/137,302, which is incorporated herein by reference. Each of the headers 46 and 48 may include at least one nozzle 50. Each of the nozzles 50 may inject ammonia substantially perpendicular to the flow of the flue gas 34. The headers 46 and 48 may also include at least one baffle plate 52 to further increase the mixing efficiency of the injected ammonia and flue gas. The baffle plate 52 associated with each of the headers may be a substantially V-shaped baffle plate 52. As shown in FIG. 8, the substantially V-shaped baffle plate may be associated with the downstream side of the header 46 or 48. The substantially V-shaped baffle plate 52 may be secured to the header 46 or 48 at an angle 54, such as approximate twenty (20) degree angle relative to the flow of flue gas 34, and may also form an angle 56, for example approximate forty-four (44) degrees, with the nozzle 50 of the header 46 or 48, as shown in FIG. 8. The opposing ends 58 and 60 of the substantially V-shaped baffle plate 52 of the header 46 or 48 may form an angle 62, for example approximately one-hundred and sixteen (116) degrees. The substantially V-shaped baffle plate 52 associated with the header 46 or 48 acts in conjunction with the corrugated turbulence enhancer 36 for uniform distribution of ammonia and flue gas prior to flowing to the downstream SCR catalyst.

Figure 9:
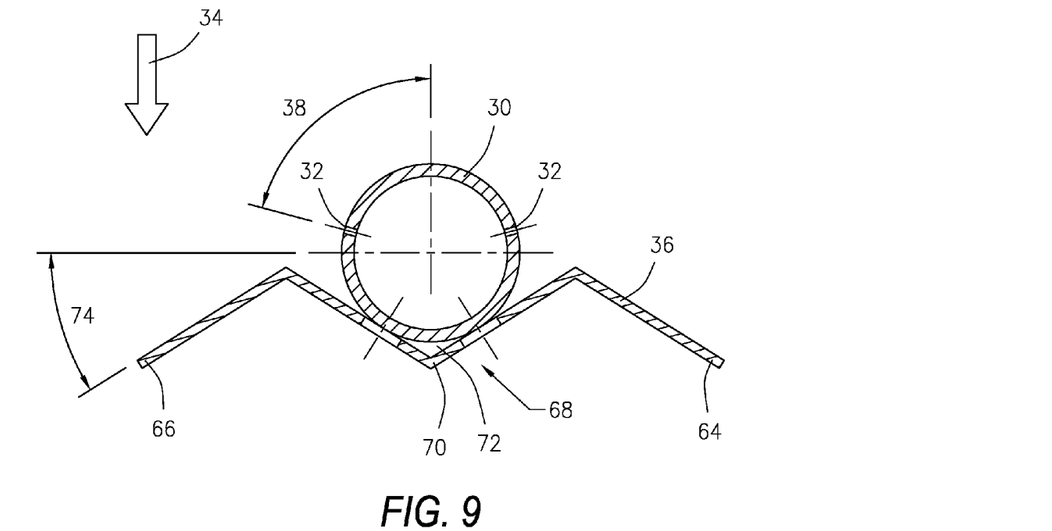
FIG. 9 is a cross section view along line 9-9 of the ammonia injection grid panel shown in FIG. 7.

The corrugated turbulence enhancer 36 associated with each of the injection tubes 30 of the AIG 28 may be associated with the downstream side of each injection tube 30. Turning now to FIG. 9, the corrugated turbulence enhancer 36 may be substantially M-shaped, with a first trailing end 64 and a second trailing end 66 connected to a substantially V-shaped middle section 68. An apex 70 of the substantially V-shaped middle section 68 of the corrugated turbulence enhancer 36 can form a trailing middle section. A furrow 72 of the substantially V-shaped middle section 68 of the corrugated turbulence enhancer 36 may be associated with the injection tube 30. The first and second trailing ends 64 and 66 of the corrugated turbulence enhancer 36 are at an angle 74 relative to the flow of flue gas 34, such as an approximate thirty-two (32) degree angle.

Figure 10:
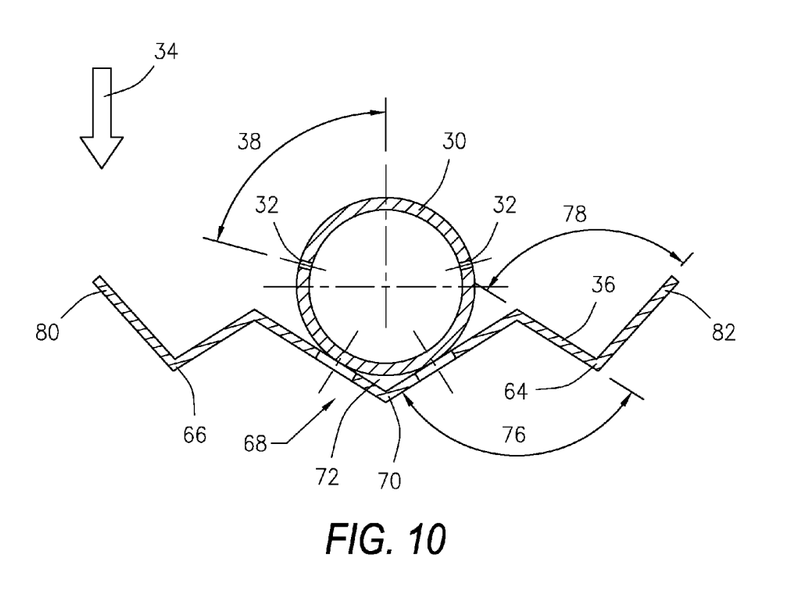
FIG. 10 is a cross section view of another example of a corrugated turbulence enhancer in accordance with an illustrative embodiment of the ammonia injection grid for selective catalytic reduction systems disclosed herein.

FIG. 10 illustrates another example of the corrugated turbulence enhancer 36 of the ammonia injection grid 28. As shown in FIG. 10, the corrugated turbulence enhancer 36 may be associated with the downstream side of each injection tube 30. The corrugated turbulence enhancer 36 may include a first leading end 80 joined to the first trailing end 66 and a second leading end 82 joined to the second trailing end 64. As shown, the corrugated turbulence enhancer 36 may be in the form of three (3) contiguous, substantially V-shapes. The two (2) outer V-shapes of the corrugated turbulence enhancer may form an angle 78, which may be approximately one-hundred (100) degrees. Further, an angle 76 between the apex 70 of the substantially V-shaped middle section 68 of the corrugated turbulence enhancer 36 and the apex of each of the substantially V-shaped outer sections may be approximately one-hundred and sixteen (116) degrees. The addition of the first leading end 80 and the second leading end 82 to the corrugated turbulence enhancer 36 further enhances the turbulent wake downstream of the injection tubes 30, resulting in an increased mixing efficiency between the injected ammonia and the flow of flue gas.

Figure 11:
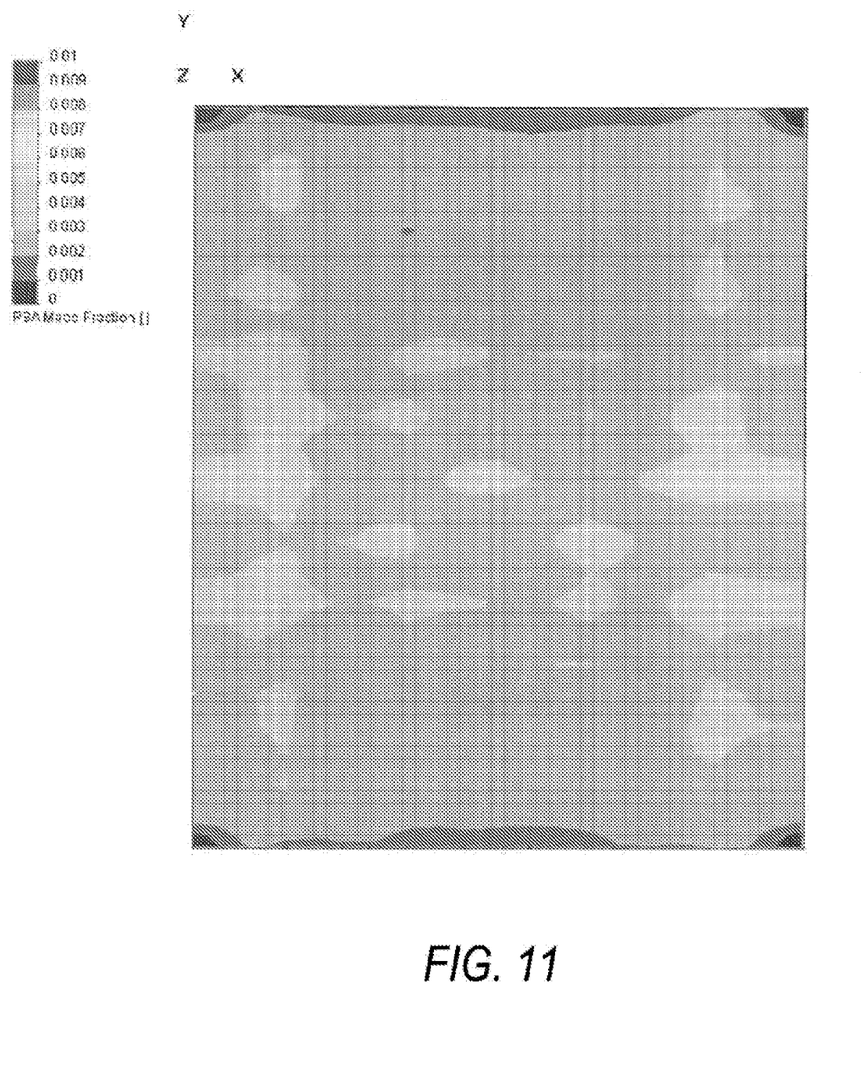
FIG. 11 illustrates a flow distribution of the ammonia injection grid for selective catalytic reduction systems disclosed herein.

Referring now to FIG. 11 which illustrates a flow distribution from a CFD analysis of the AIG 28 disclosed herein having a corrugated turbulence enhancer 36 to efficiently mix the injected ammonia into the flow of flue gas 34 at approximately three (3) feet downstream from the ammonia injection. As can be seen, the AIG 28 provides uniform distribution of ammonia in the flue gas at the face of the catalyst bed. The corrugated turbulence enhancer 36 of the AIG 28 provides even distribution of ammonia to the SCR catalyst for heat recovery steam generation systems, packaged boilers, simple cycle catalyst systems and fired heaters for superior operational efficiency.

The corrugated turbulence enhancer 36 of the AIG 28 dramatically increases mixing efficiency and reduces the mixing distance, as illustrated by a comparison of FIGS. 2, 4 and 11. This reduction and increased efficiency allows for a compact SCR system and provides a significant capital cost reduction. The corrugated turbulence enhancer 36 disclosed herein allows for a low downstream pressure drop to further increase the overall efficiency of the SCR system. In addition, the corrugated turbulence enhancer 36 disclosed herein may be retrofitted to existing ammonia injection grids to achieve the benefits discussed above. The corrugated turbulence enhancer 36 may be secured to existing ammonia injection grids on the downstream side of the injection tubes 30.

The entire ammonia injection grid may be constructed to be mounted on a skid to be easily transported to a desired location.

Whereas, the devices and methods have been described in relation to the drawings and claims, it should be understood that other and further modifications, apart from those shown or suggested herein, may be made within the spirit and scope of this invention.

What is claimed is:

1. An ammonia injection grid, comprising:
an injection tube having at least one nozzle for injecting ammonia into a flow of flue gas, wherein the injection tube extends generally transverse to the flow of flue gas, wherein the at least one nozzle of the injection tube forms an upstream angle relative to the flow of flue gas; and
a corrugated turbulence enhancer immediately adjacent to a downstream side of the injection tube to generate turbulent wake in order to enhance turbulent mixing, wherein the corrugated turbulence enhancer is aligned substantially parallel to the injection tube, wherein the injection tube is seated within a furrow of the corrugated turbulence enhancer.

2. The ammonia injection grid of claim 1 wherein the injection tube comprises a plurality of elongate, circular injection tubes aligned in parallel, wherein each injection tube is provided with a plurality of nozzles, and wherein the corrugated turbulence enhancer comprises a plurality of corrugated turbulence enhancers associated with each injection tube.

3. The ammonia injection grid of claim 2 wherein each of the nozzles forms an approximate 75 degree upstream angle relative to the flow of flue gas.

4. The ammonia injection grid of claim 1 wherein the ammonia injection grid comprises a plurality of ammonia injection grid panels.

5. The ammonia injection grid of claim 1 comprising at least one upper ammonia injection grid panel and at least one lower injection grid panel.

6. The ammonia injection grid of claim 1 further comprising an upper header and a lower header in fluid communication with the injection tube for supplying ammonia to the injection tube.

7. The ammonia injection grid of claim 6 wherein the upper header and the lower header are provided with a substantially V-shaped baffle plate.

8. The ammonia injection grid of claim 7 wherein the substantially V-shaped baffle plate of the upper header and the lower header form an approximate 20 degree angle relative to the flow of flue gas.

9. The ammonia injection grid of claim 7 comprising a nozzle in the upper header and a nozzle of the lower header, wherein the nozzle of the upper header and the nozzle of the lower header inject ammonia substantially perpendicular to the flow of flue gas.

10. The ammonia injection grid of claim 1 wherein the corrugated turbulence enhancer comprises a first trailing end and a second trailing end connected to a substantially V-shaped middle section.

11. The ammonia injection grid of claim 10 wherein an apex of the substantially V-shaped middle section forms a trailing middle section.

12. The ammonia injection grid of claim 10 wherein the injection tube is seated within and connected to the furrow of the substantially V-shaped middle section of the corrugated turbulence enhancer.

13. The ammonia injection grid of claim 10 wherein the first trailing end and the second trailing end of the corrugated turbulence enhancer form an approximate 32 degree angle relative to the flow of flue gas.

14. The ammonia injection grid of claim 10 further comprising a first leading end joined to the first trailing end and a second leading end joined to the second trailing end.

15. The ammonia injection grid of claim 1 wherein the corrugated turbulence enhancer is substantially M-shaped.

16. The ammonia injection grid of claim 1 wherein the corrugated turbulence enhancer is formed from three contiguous, substantially V-shaped sections.

17. An ammonia injection grid panel for a selective catalytic reduction (SCR) system, said ammonia injection grid panel comprising:
a plurality of elongate injection tubes, each injection tube having a plurality of injection nozzles at upstream angles relative to a flow of flue gas for injecting ammonia in a direction generally counter to the flow of flue gas, wherein each injection tube extends generally transverse to the flow of flue gas;
a plurality of corrugated turbulence enhancers having a middle furrow section associated with a downstream side of each injection tube to generate turbulent wake to enhance turbulent mixing of the injected ammonia and flue gas, wherein the corrugated turbulence enhancers are aliened substantially parallel to the injection tubes;
a header in fluid communication with each injection tube for supplying the ammonia, wherein the header has at least one header nozzle for injecting the ammonia at an angle substantially perpendicular relative to the flow of flue gas; and
a baffle plate associated with a downstream side of the header to further generate turbulent wake to enhance turbulent mixing of the injected ammonia and flue gas.

18. The ammonia injection grid panel of claim 17 wherein each corrugated turbulence enhancer is substantially M-shaped or is formed from three contiguous, substantially V-shaped sections.

19. The ammonia injection grid panel of claim 17 wherein the baffle plate is a substantially V-shaped baffle plate connected to the header.

20. The ammonia injection grid panel of claim 17 wherein the ammonia injection grid panel comprises a plurality of ammonia injection grid panels.

21. The ammonia injection grid panel of claim 17 wherein each corrugated turbulence enhancer comprises a first trailing end and a second trailing end connected to a substantially V-shaped middle furrow section.

22. The ammonia injection grid of claim 21 further comprising a first leading end joined to the first trailing end and a second leading end joined to the second trailing end.

23. An ammonia injection grid for a selective catalytic reduction (SCR) system, said ammonia injection grid comprising:
at least one upper ammonia injection grid panel comprising:
a plurality of elongate upper injection tubes, each upper injection tube having a plurality of upper injection nozzles for injecting ammonia in a direction generally counter to a flow of flue gas, wherein each upper injection tube extends generally transverse to the flow of flue gas;

a plurality of upper corrugated turbulence enhancers having a middle furrow section associated with a downstream side of each upper injection tube to generate turbulent wake to enhance turbulent mixing of the injected ammonia and flue gas, wherein the upper corrugated turbulence enhancers are aligned substantially parallel to the upper injection tubes;

an upper header in fluid communication with each upper injection tube for supplying the ammonia;

a lower header in fluid communication with each upper injection tube for supplying the ammonia, the lower header having a plurality of lower header nozzles for injecting the ammonia at an angle substantially perpendicular relative to the flow of flue gas; and a substantially V-shaped baffle plate associated with a downstream side of the lower header to further generate turbulent, wake to enhance turbulent mixing of the injected ammonia and flue gas;

at least one lower ammonia injection grid panel comprising:

a plurality of elongate lower injection tubes, each lower injection tube having a plurality of lower injection nozzles for injecting ammonia in a direction generally counter to a flow of flue gas, wherein each lower injection tube extends generally transverse to the flow of flue gas;

a plurality of lower corrugated turbulence enhancers having a middle furrow section associated with a downstream side of each lower injection tube to generate turbulent wake to enhance turbulent mixing of the injected ammonia and flue gas, wherein the lower corrugated turbulence enhancers are aligned substantially parallel to the lower injection tubes;

a lower header in fluid communication with each lower injection tube for supplying the ammonia;

an upper header in fluid communication with each lower injection tube for supplying the ammonia, the upper header having a plurality of upper header nozzles for injecting the ammonia at an angle substantially perpendicular relative to the flow of flue gas; and a substantially V-shaped baffle plate associated with a downstream side of the upper header to further generate turbulent wake to enhance turbulent mixing of the injected ammonia and flue gas.

24. The ammonia injection grid of claim 23 wherein each corrugated turbulence enhancer is substantially M-shaped or is formed from three contiguous, substantially V-shaped sections.

25. The ammonia injection grid of claim 23 wherein the lower header of the upper ammonia injection grid panel is substantially parallel with the upper header of the lower ammonia injection grid panel.

26. The ammonia injection grid of claim 23 wherein the baffle plate of the lower header of the upper ammonia injection grid panel is immediate adjacent to the baffle plate of the upper header of the lower ammonia injection grid panel.

27. The ammonia injection grid of claim 26 wherein the baffle plate of the lower header of the upper ammonia injection grid is a mirror image relation of the baffle plate of the upper header of the lower ammonia injection grid.

28. The ammonia injection grid panel of claim 23 wherein each corrugated turbulence enhancer comprises a first trailing end and a second trailing end connected to a substantially V-shaped middle furrow section.

29. The ammonia injection grid of claim 28 further comprising a first leading end joined to the first trailing end and a second leading end joined to the second trailing end.

* * * * *